United States Patent [19]

Naito et al.

[11] Patent Number: 5,052,505
[45] Date of Patent: Oct. 1, 1991

[54] LOAD CELL

[75] Inventors: Kazufumi Naito; Seiji Nishide, both of Shiga; Hiroyuki Konishi; Noboru Kosugi, both of Kyoto, all of Japan

[73] Assignee: Ishida Scales Mfg. Co., Ltd., Kyoto, Japan

[21] Appl. No.: 528,580

[22] Filed: May 24, 1990

[30] Foreign Application Priority Data

May 24, 1989 [JP] Japan ................................ 1-60663[U]

[51] Int. Cl.$^5$ ........................... G01G 3/08; G01L 1/22
[52] U.S. Cl. .................................... 177/229; 73/862.65
[58] Field of Search ............................... 177/211, 229; 73/862.65, 862.66

[56] References Cited

U.S. PATENT DOCUMENTS 4,343,197  8/1982  Suzuki et al. .................. 73/862.65
4,549,439 10/1985  Keen et al. ..................... 73/862.65
4,557,150 12/1985  Utsunomiya .................... 73/862.65

Primary Examiner—George H. Miller, Jr.
Attorney, Agent, or Firm—Heller, Ehrman, White & McAuliffe

[57] ABSTRACT

A load cell has a cantilever-type load-sensitive element with an upper beam and a lower beam, each having formed thereon a pair of strain-generating parts which generates a strain corresponding to an applied load. Only one of these two beams has an indented part formed on its surface and strain-detecting elements are attached to its bottom surface at positions corresponding to the strain-generating parts. A moisture-proof sheet is attached to the beam to completely seal the interior of this indented part to protect the strain-detecting elements from humidity and moisture.

13 Claims, 4 Drawing Sheets

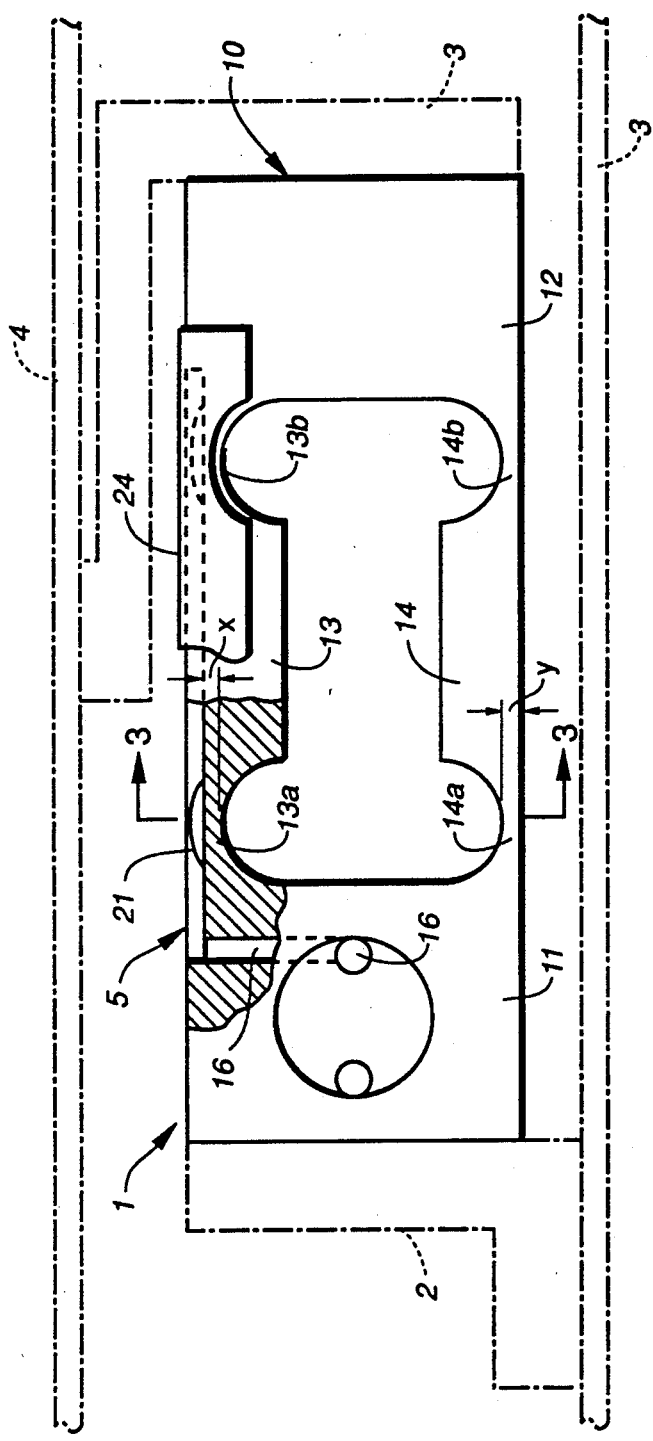
FIG._1
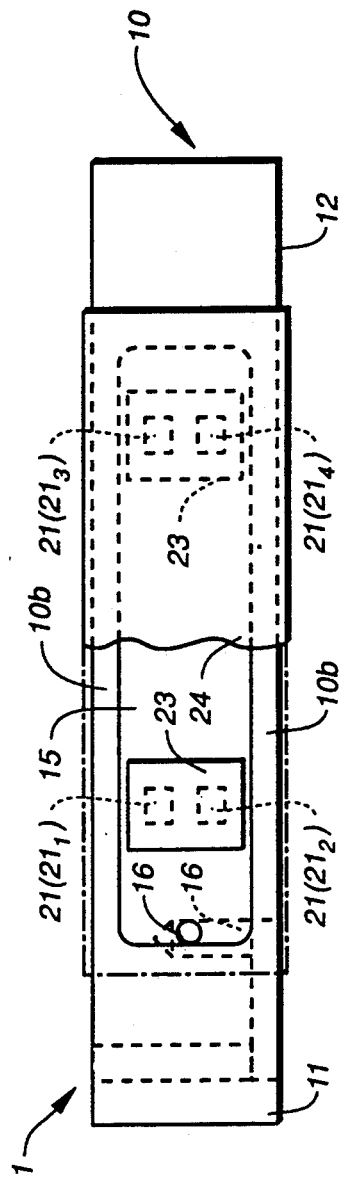
FIG._2

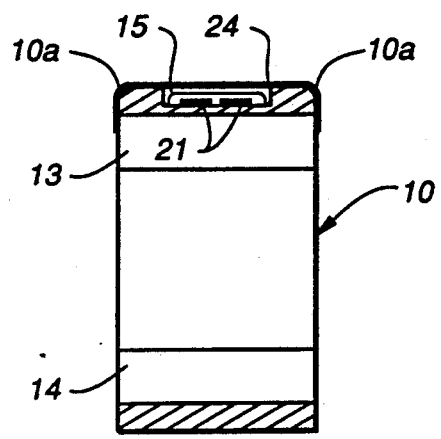
FIG._3
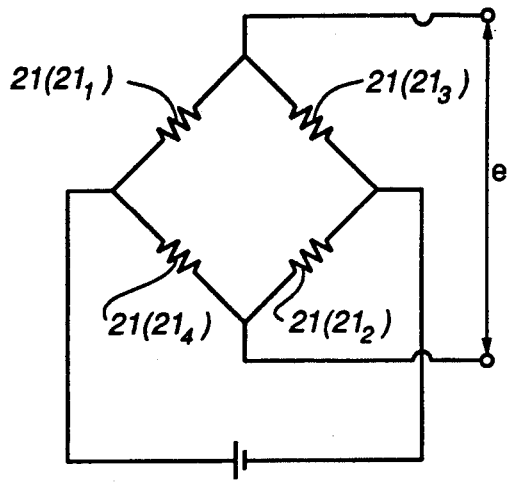
FIG._4
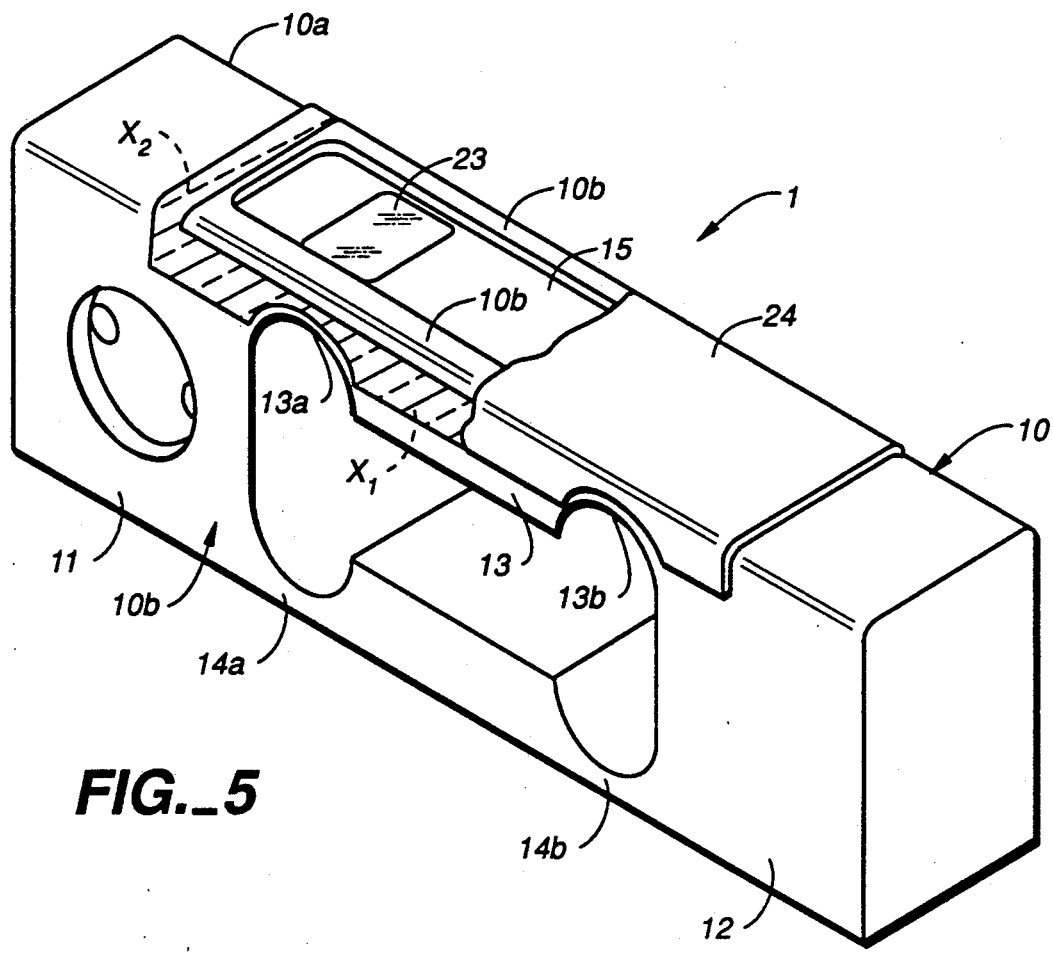
FIG._5

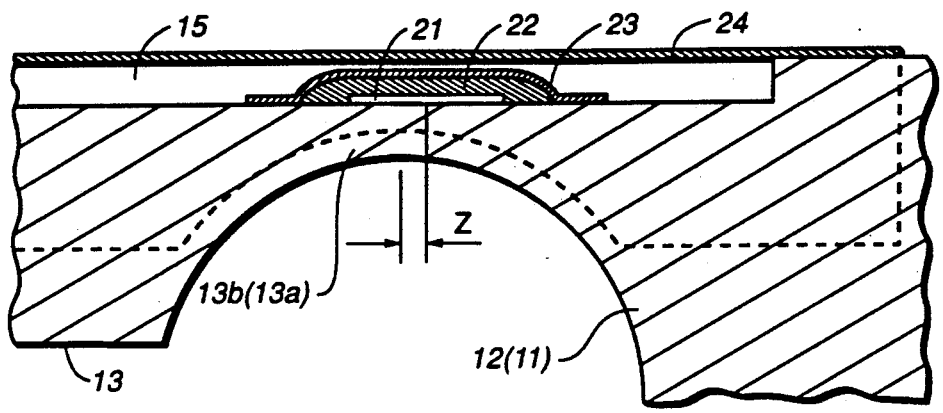
FIG._6
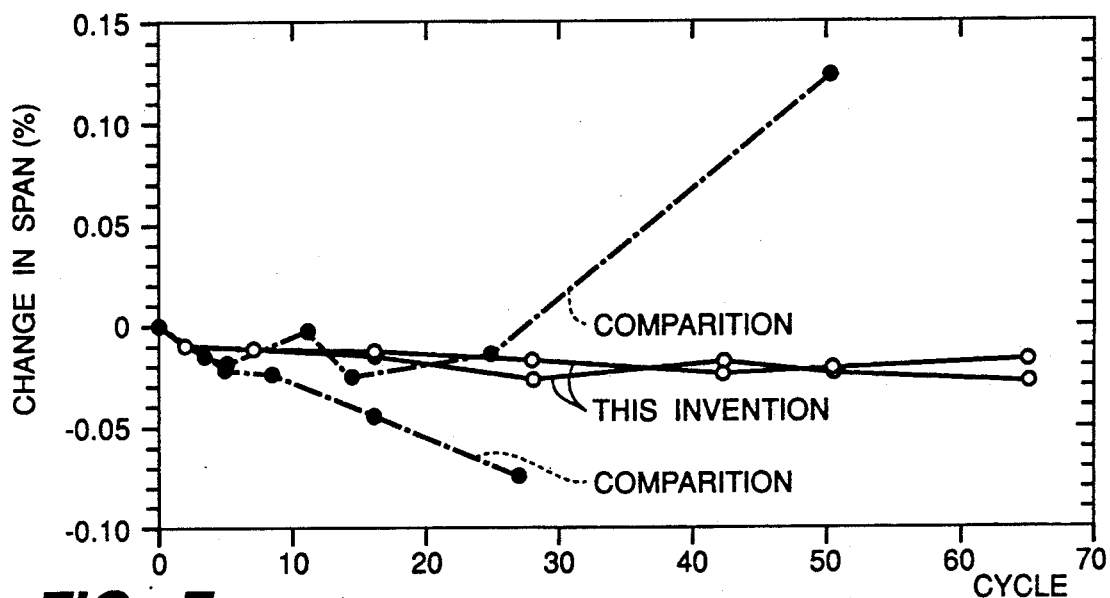
FIG._7
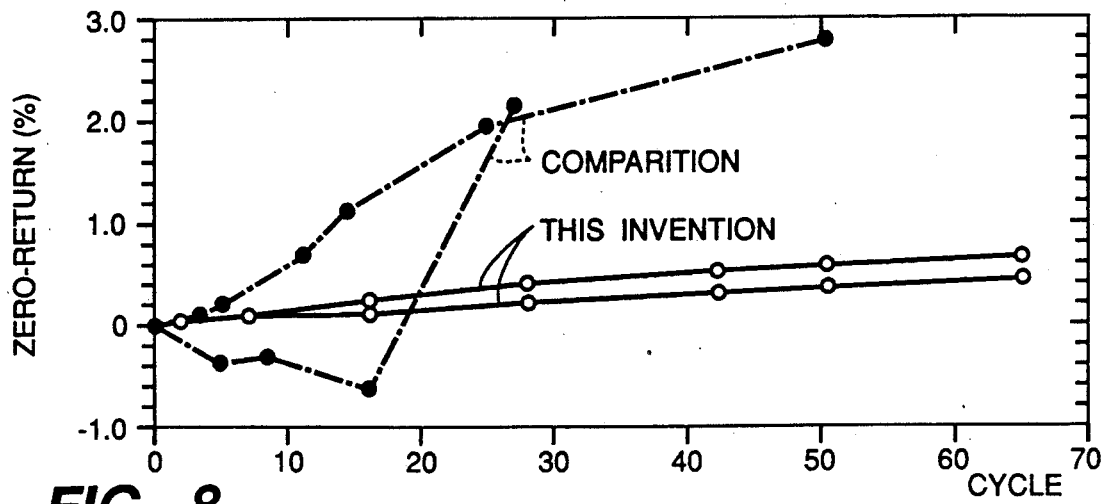
FIG._8

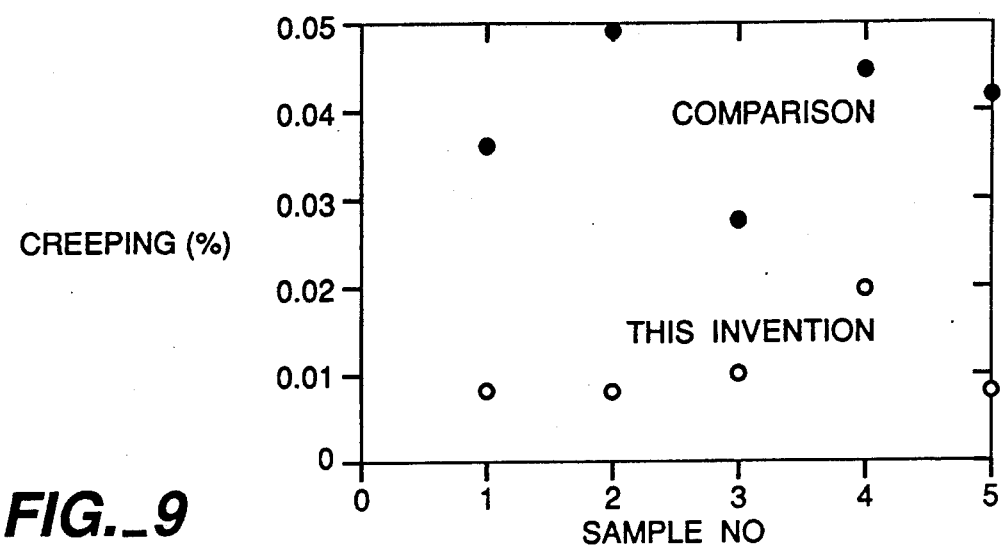
FIG._9
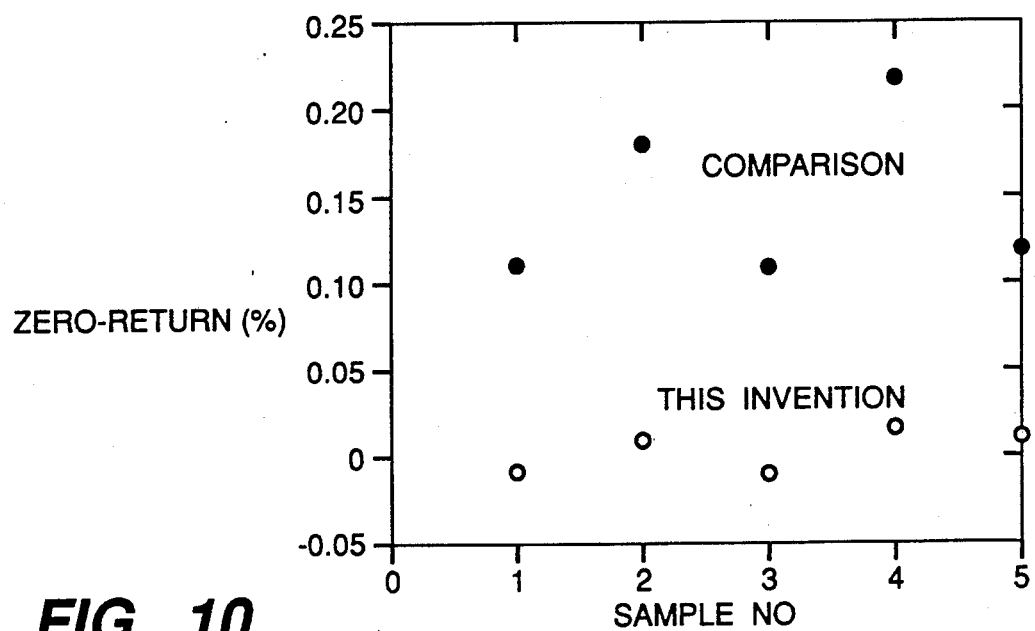
FIG._10
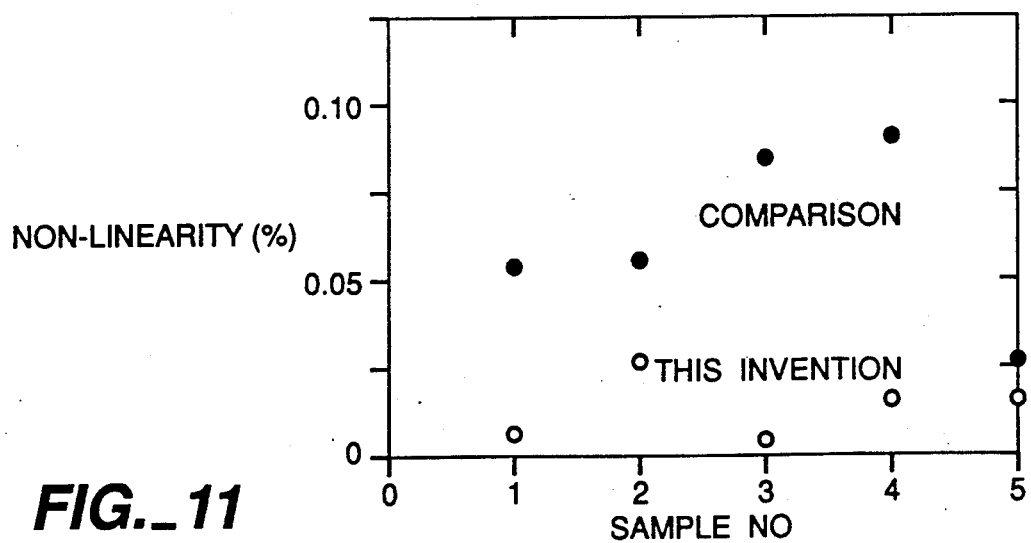
FIG._11

LOAD CELL

BACKGROUND OF THE INVENTION

This invention relates to load cells used in electronic scales and other weighing apparatus and, more particularly, to such load cells having improved moisture-proofing means.

A cantilever-type load cell which is commonly used in electronic scales generally comprises a load-sensitive element having an upper beam and a lower beam forming a pair. Two strain-generating parts are formed on each of these two beams and strain-detecting elements such as strain gauges are attached individually to such strain-generating parts on the beams so as to measure the tensile and compressive strains at these parts caused by a load applied to the load-sensitive element and to thereby determine the magnitude of the load itself.

Moisture-proofing means are sometimes provided to these strain-detecting elements of a load cell of this type in order to protect these elements against moisture and humidity and to thereby enhance their durability. Examples of moisture-proofing method which has been tried include covering the elements by a material such as silicone rubber and butyl rubber. Such organic polymer materials, however, are moisture-permeable to a certain extent because of their molecular structures. Although they do not totally lack in moisture-proofing effect, they are not sufficiently effective especially when the load cell is used in a very humid or moist environment.

In view of the above, there have been attempts to cover the strain-detecting elements with aluminum foil or a metallic moisture-proof sheet or cover of a layered structure with a synthetic resin film on aluminum foil. Since such sheets and covers are not sufficiently elastic, however, they tend to impede the free deformation of the load-sensitive element corresponding to the load which is applied thereon. Thus, it is now being attempted not to attach these sheets and covers directly on the strain-detecting elements but to provide a space therebetween. Japanese Utility Model Publication Jikkai 61-30838, for example, discloses a load-sensitive element with a pair of upper and lower beams each characterized as having an indented part on its surface such that load-sensitive elements are placed in these indented parts which are then sealed by cover means. Japanese Utility Model Publication Jikkai 59-183639, on the other hand, discloses a method of providing water-proofing putty on such beams above and below the load-sensitive element around the positions where strain-detecting elements are to be attached such that water-proofing sheets placed thereover can tightly seal the strain-detecting elements with a space provided therearound.

The prior art attempts described above are not satisfactory for several reasons. Firstly, it requires additional production processes to provide such moisture-proofing means on the surfaces of both upper and lower beams for the load-sensitive element.

This implies an increase in the production cost. Secondly, there still remain problems relating to the accuracy of measurement as well as moisture-proofing because, even if metallic moisture-proofing sheets and covers are attached indirectly by providing a space around each strain-detecting element, it is impossible to completely prevent them from affecting the strain of the load-sensitive element according to the applied load. If these sheets or covers are attached to the beams, their effects may be magnified and adversely affect the accuracy of measurement. Since moisture-proofing must be effected at two positions, furthermore, there is an increased probability of occurrence of a defect which may eventually affect the durability of the load cell.

SUMMARY OF THE INVENTION

It is therefore an object of the present invention to provide a load cell with moisture proofing means.

It is another object of the invention to provide such a load cell capable of measuring weight accurately.

It is still another object of the invention to provide such a load cell which can be manufactured at a relatively lower cost.

It is a further object of the invention to provide such a load cell with improved durability.

A load cell embodying the present invention with which the above and other objects can be achieved may be characterized as being a cantilever-type with an upper beam and a lower beam, each of these beams having formed thereon a pair of strain-generating parts adapted to generate a strain corresponding to an applied load. Either one of these two beams has an indented part formed on its surface, the indented part being lower than the edge parts therearound. Strain-detecting elements are attached to the bottom surface of this indented part at positions corresponding to the strain-generating parts and covered by a moisture-proof material. The interior of the indented part is completely sealed by a moisture-proof sheet which is attached to only small areas of this beam but not to the moisture-proof material so as not to significantly interfere with the deformation of the cell.

When a load is applied to a load cell thus structured, tensile and compressive strains generated correspondingly to the load at the strain-generating parts are detected by the strain-detecting elements and the load is calculated on the basis of these detected strains. Since the strain-detecting elements are all attached to the bottom surface of the indented part and the interior of this indented part is completely sealed by a moisture-proof sheet, these elements are well protected against humidity and moisture. In particular, since this indented part and the moisture-proof sheet are provided to only one of the beams, both the production cost of the load cell and the interfering effect of the moisture-proof sheet on the free deformation of the load cell are significantly reduced. Moreover, since a plurality of strain-detecting elements are protected against humidity and moisture by a single moisture-proofing means, occurrence of problems related to durability caused by defective moisture-proofing can also be reduced significantly.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a front view of a load cell embodying the present invention,

FIG. 2 is a plan view of the load cell of FIG. 1,

FIG. 3 is a sectional side view of the load cell of FIGS. 1 and 2 taken along line III—III of FIG. 1, FIG. 4 is a circuit diagram of a Wheatstone bridge of the load cell of FIGS. 1—3, FIG. 5 is a perspective view of the load cell of FIGS. 1—3, FIG. 6 is an enlarged view of a part of FIG. 1 near one of the strain gauges attached to the bottom surface of the indented part, FIG. 7 is a graph of time-rates of change in span both for sample load cells embodying the present invention and prior art samples, FIG. 8 is a graph of time-rates of change in zero point for sample load cells embodying the present invention and prior art samples, FIG. 9 is a graph showing the results of creep tests on load cells of the present invention and prior art load cells, FIG. 10 is a graph showing the results of zero-return tests on load cells of the present invention and prior art load cells, and FIG. 11 is a graph showing the results of non-linearity tests on load cells of the present invention and prior art load cells.

DETAILED DESCRIPTION OF THE INVENTION

With reference simultaneously to FIGS. 1, 2 and 3, numeral 1 indicates a load cell embodying the present invention. Numeral 10 indicates a load-sensitive element which serves as the main body of this load cell 1 and has a hollow, rectangular configuration with a rigid fixed portion 11 on the left-hand side (with reference to FIG. 1), a rigid movable portion 12 on the right-hand side (with reference also to FIG. 1) and a pair of upper and lower beams 13 and 14 between these two rigid portions 11 and 12. If this load cell 1 is incorporated in an electronic scale, the rigid fixed portion 11 might be affixed to the main structure 3 of the scale by a bracket 2 and a tray 4 to the rigid movable portion 12 by another bracket 3. At both ends of the upper and lower beams 13 and 14 where these beams 13 and 14 join the rigid portions 11 and 12, the beam widths are reduced by the formation of semicircular cutouts on the inner sides of the beams 13 and 14 to define strain-generating parts 13a, 13b, 14a and 14b as shown in FIG. 1. If a load is applied and the rigid movable portion 12 is thereby displaced downward with respect to the rigid fixed portion 11, tensile strains are generated on the surfaces of the strain-generating part 13a at the junction between the upper beam 13 and the rigid fixed portion 11 and the part 14b at the junction between the lower beam 14 and the rigid movable portion 12, while compressive strains are similarly generated at the strain-generating parts 13b and 14a respectively at the junction between the upper beam 13 and the rigid movable portion 12 and at the junction between the lower beam 14 and the rigid fixed portion 11.

The upper surface of the upper beam 13 is provided with an indented part 15 which includes both the strain-generating parts 13a and 13b and is lower than its surrounding sections. On the bottom surface of this indented part 15, there are two strain gauges $21_1$ and $21_2$ attached at the left-hand strain-generating part 13a and two others $21_3$ and $21_4$ at the right-hand strain-generating part 13b. In other words, a total of four strain gauges 21 is attached to the top of the load-sensitive element 10 on the bottom surface of the indented part 15. Lead lines (not shown) connected individually to these strain gauges 21 are passed through throughholes 16 and taken out through both side surfaces of the rigid fixed portion 11. These throughholes 16 are eventually filled with a moisture-proof filler material after these lead lines are passed therethrough.

As shown in FIGS. 3 and 5, the longitudinal side edges 10a of the entire top surface of the load-sensitive element 10 inclusive of the rigid portions 11 and 12 and the upper beam 13 are rounded. With reference next to FIG. 1, the thickness x of the upper beam 13 at the strain-generating parts 13a and 13b as measured from the bottom surface of the indented part 15 is made somewhat smaller than the thickness y of the lower beam 14 at the strain-generating parts 14a and 14b. This is in order to make the rigidity of the upper beam 13 at the parts 13a and 13b equal to that of the lower beam 14 at the parts 14a and 14b because the longitudinally extending edge parts 10b on both sides of the indented part 15 serve as rigidity-enhancing beams stretched between the rigid fixed portion 11 and the rigid movable portion 12.

The four strain gauges 21 form a Wheatstone bridge circuit as shown in FIG. 4 such that an output voltage e is obtained from a specified input voltage E according to the changes in resistance of the individual strain gauges 21. With reference next to FIG. 2, the strain gauges $21_1$ and $21_2$ proximal to the rigid fixed portion 11 experience tensile strains and the strain gauges $21_3$ and $21_4$ proximal to the rigid movable portion 12 experience compressive strains when a load is applied to the load cell 1. Let us assume now that these strain gauges 21 are connected as shown in FIG. 4. If the initial resistance values of the strain gauges $21_1$–$21_4$ are respectively $R_{10}$, $R_{20}$, $R_{30}$ and $R_{40}$, their changes caused by strain are respectively $\Delta R_1$, $\Delta R_2$, $\Delta R_3$ and $\Delta R_4$ and their resistance values after the changes are respectively $R_1$, $R_2$, $R_3$ and $R_4$, $$R_1 = R_{10} + \Delta R_1$$

$$R_2 = R_{20} + \Delta R_2$$

$$R_3 = R_{30} + \Delta R_3$$

$$R_4 = R_{40} + \Delta R_4$$

and the Wheatstone bridge formula provides $$e = (\Delta R_1/R_{10} + \Delta R_2/R_{20} - \Delta R_3/R_{30} - \Delta R_4/R_{40}) \times R_{10}R_{20}E/(R_{10}+R_{20})^2.$$

If $R_{10} = R_{20} = R_{30} = R_{40} = R$ in particular, $\Delta R_1 = \Delta R_2 = -\Delta R_3 = -\Delta R_4 = \Delta R$ and we obtain $$e = (\Delta R/R)E.$$

In other words, the output voltage e is proportional to the fractional change ($\Delta R/R$) in the resistance of each strain gauge 21.

The load cell 1 is further provided with moisture-proofing means for protecting its strain gauges 21 from humidity and moisture. As shown enlarged in FIG. 6, not only are the strain gauges 21, which is attached to the bottom surface of the indented part 15, covered by a moisture-proofing material 22 such as silicone rubber or butyl rubber which is applied thereon but a small piece of a polymer film such as polytetrafluoroethylene (Teflon) or a composite metallic foil-polymer film formed with metallic foil (for example, of aluminum)

over a moisture-proof polymer film of polyester, polypropylene, polyethylene or the like (hereinafter generally referred to as a covering member 23 whether the polymer film is laminated or not laminated with a metallic foil) is attached to this moisture-proofing material 22 from above. The indented part 15 itself is tightly sealed by a moisture-proof sheet 24 of a composite metallic foil-polymer film of the type described above which is attached to the top surface of the load-sensitive element 10 by applying an adhesive only on the frame-shaped area shown shaded in FIG. 5. Described more in detail with reference to FIG. 5, the adhesive is applied only on the frame-shaped area which surrounds the indented part 15 and includes top sections $X_1$ on the side surfaces of the load-sensitive element 10 and edge sections $X_2$ extending transversely in the direction of the width over the top surface of the load-sensitive element 10 along the transverse side edges of the indented part 15. In other words, this moisture-proof sheet 24 is not adhesively attached to the aforementioned longitudinally extending edge parts 10b on both sides of the indented part 15.

Let us assume next that the load cell 1 described above is being used in an electronic scale as shown in FIG. 1. When an article to be weighed is placed on the tray 4 and its weight is transmitted through the bracket 3 to the rigid movable portion 12 at one edge of the load-sensitive element 10, this rigid movable portion 12 is displaced downward with respect to the rigid fixed portion 11 on the opposite edge part, causing tensile strains on the surface at the strain-generating part 13a of the upper beam 13 proximal to the rigid fixed portion 11 and compressive strains on the surface at the other strain-generating part 13b of the upper beam 13 proximal to the rigid movable portion 12. The resistance values of the individual strain gauges 21 are thereby changed and a voltage e indicative of the load (that is, the weight of the article being weighed) is outputted from the Wheatstone bridge circuit shown in FIG. 4. The desired weight value can be calculated from the measured value of this output voltage e.

In the meantime, since the strain gauges 21 contained inside the indented part 15 are covered by a moisture-proof material 22 such as silicone rubber and the indented part 15 itself is sealed by a moisture-proof sheet 24 of a metallic foil-polymer film of the type described above, these strain gauges 21 may be said to be doubly protected from external humidity and moisture, providing improved durability even if the load cell is used in a particularly humid and moist environment. Since the strain gauges 21 are all inside the single indented part 15 on the upper beam 13 according to the present invention, only a single moisture-proofing means is required to protect all the strain gauges 21 together. In other words, moisture-proofing is effected more efficiently according to the present invention than if strain gauges were attached to both the upper and lower beams.

Generally, when a moisture-proof sheet is attached to cover the strain-generating parts of a beam, the sheet tends to interfere with the free deformation of the load-sensitive element so as to adversely affect the accuracy of measurement of a load by the load cell. According to the present invention, however, since the strain gauges 21 are disposed only on the upper beam 13 and the moisture-proof sheet 24 is attached only to the upper beam 13, the total effect of the aforementioned interference with the free deformation of is significantly less than if moisture-proof sheets are attached to both the upper and lower beams. As a result, strains are obtained more accurately corresponding to the load at the strain-generating parts 13a, 13b, 14a and 14b according to the present invention.

Moreover, since a space is provided between the strain gauges 21 on the bottom surface of the indented part 15 and the moisture-proof sheet 24 sealing the interior of the indented part 15 and since this moisture-proof sheets 24 is attached by an adhesive only through the sections $X_1$ and $X_2$ shown in FIG. 5 and not adhesively attached to the longitudinally extending edge parts 10b, the interference with the free deformation of the load-sensitive element 10 is further reduced.

Next will be examined the effect of the moisture-proof sheet 24 on the generation of strain at the strain-generating parts, or on the change in the resistance of each strain gauge, if it were attached to the top surface of the beam. Since the moisture-proof sheet 24, thus attached, would have the effect of impeding the generation of strain, the relationship between the resistance of the strain gauges 21 before and after the change due to an applied load would be rewritten as follows:

$$R_1 = R_{10} + (\Delta R_1 - \Delta r_1)$$

$$R_2 = R_{20} + (\Delta R_2 - \Delta r_2)$$

$$R_3 = R_{30} - (\Delta R_3 - \Delta r_3)$$

$$R_4 = R_{40} - (\Delta R_4 - \Delta r_4)$$

where the changes in resistance of the strain gauges $21_1$–$21_4$ due to the moisture-proof sheet 24 are written respectively as $\Delta r_1$, $\Delta r_2$, $\Delta r_3$ and $\Delta r_4$. If $\Delta r_1 = \Delta r_2 = \Delta r_3 = \Delta r_4 = \Delta r$, we obtain, similarly as before, $$e = (\Delta R - \Delta r)E/R.$$

According to the present invention, however, the moisture-proof sheet 24 is attached to the top surface of the load-sensitive element 10 only through relatively small sections ($X_2$). Thus, the effect of the moisture-proof sheet 24 can be reduced from the expression given above and the accuracy of measurement by the load cell 1 can be maintained at a high level.

If a load is applied eccentrically, the strain gauges $21_1$–$21_4$ all experience a tensile strain. In such a situation, the changes in resistance of the strain gauges caused by these strains and the effect of the moisture-proof sheet 24 tend to cancel each other. Accordingly, it is advantageous to have all strain gauges attached to one of the beams from the point of view of accuracy of measurement in the case of an eccentrically applied load.

There will next be presented the results of tests performed both on sample load cells embodying the present invention as described above and comparison samples. For FIGS. 7 and 8, use was made as comparison samples those which are similar to the samples embodying the present invention except their strain gauges are covered only by silicone rubber or the like and there is no moisture-proof sheet of the kind shown at 24 in FIG. 6. For the tests for comparing the changes in moisture-proof characteristics of these samples, one cycle is defined as a first period of 12 hours during which samples are left under a temperature-humidity condition of 25° C. and 95%, followed by a second period of 12 hours during which they are left under another condition of 55° C. and 95%, and the samples were made to undergo several cycles. FIG. 7 relates to the rate of change in the span, that is, the difference in the output between the no-load situation and when a load of 15 Kg is applied as compared to its initial value, and FIG. 8 relates to the rate of change in the zero-point, that is, the output value under a no-load condition as compared to its initial value. These experimental results clearly show that the rates of change in span and zero-point are significantly smaller with the load cell samples according to the present invention than with prior art samples. It is also noteworthy that the fluctuations in the measured values among the tested samples are also smaller in the case of those according to the present invention.

FIGS. 9-11 are the results of tests for showing the effects of not attaching the moisture-proof sheet to the top surface of the load-sensitive element. For this purpose, use was made as comparison samples those which are similar to the samples embodying the present invention except the moisture-proof sheet (similar to that shown at 34 in FIG. 6) was attached to the entire contacting (top) surface of the load-sensitive body. FIG. 9 relates to creep tests wherein the input voltage was 12 V, a load of 15 Kg was applied for 30 minutes and the difference between the output value under a no-load condition and that with the load of 15 Kg after the test (the span) was compared with the initial value. FIG. 10 relates to zero-return tests wherein the zero point after a load was applied under the same conditions as above and its change from the initial value was observed. FIG. 11 relates to non-linearity tests wherein a straight line was drawn between the output value under a no-load condition and the output when a load of 15 Kg was applied and the maximum deviation from this straight line among the output values when the applied load was 3 Kg, 6 Kg, 9 Kg and 12 Kg was obtained by taking the effects of hysteresis into consideration. FIGS. 9-11 show that the effects of not attaching the moisture-proof sheet directly to the top surface of the load-sensitive element are clearly visible in all of these tests.

As explained above with reference to FIGS. 3 and 5, the longitudinally extending edge parts 10b are rounded. This is for preventing the moisture-proof sheet 24 from becoming damaged by a sharp edge. The purpose of the covering member 23 shown in FIG. 6 and made of a Teflon sheet or a piece of a metallic foil-polymer film of the type described above is to prevent the moisture-proof material 22, which is usually sticky, from becoming attached by its own stickiness to the moisture-proof sheet 24 disposed thereabove. It is further to be noted, as shown in FIG. 6, that the strain gauges 21 are not attached exactly at the strain-generating parts 13a and 13b defined as the parts where the thickness of the upper beam is the smallest. Instead, the strain gauges 21 are slightly displaced from the strain-generating parts 13a and 13b by a specified distance Z towards the edge of the load-sensitive element 10. This is because, in the case of a load cell having strain gauges attached to only one beam on one side of the its load-sensitive element, a linear relationship between applied load and output voltage is not obtained if the strain gauges are disposed exactly at the strain-generating parts, while a good linearity relationship can be obtained if the strain gauges are attached, as shown in FIG. 6, slightly displaced from the strain-generating parts towards the nearer edge of the load-sensitive element.

The foregoing description of a preferred embodiment of the invention has been presented for purposes of illustration and description. It is not intended to be exhaustive or to limit the invention to the precise form disclosed, and many modifications and variations are possible in light of the above teaching. For example, although the strain gauges 21 and the means for protecting them against humidity and moisture are all provided on the upper surface of the upper beam 13 according to the embodiment described above, they may be provided instead on the lower surface of the lower beam 14. Alternatively, semicircular indentations for providing strain-generating parts may be formed on the upper surface of the upper beam 13 and the lower surface of the lower beam 14. With strain-generating parts thus formed, strain gauges 21 and means for their protection may be attached to the lower surface of the upper beam 13 or the upper surface of the lower beam 14 although such alternatives are not illustrated. Another effective variation to the embodiment described above is to enclose dry air or nitrogen gas inside the indented part 15 sealed by the moisture-proof sheet 24. Moreover, semiconductor gauges comprising amorphous silicon or elastic surface wave oscillator gauges may be used as strain-detecting elements instead of strain gauges. Still further, although FIG. 2 shows two strain gauges 21 at each of the two strain-generating parts 13a and 13b on the upper beam 13, it is possible to attach only one strain gauge at each of two strain-generating parts on either the upper beam 13 or the lower beam 14. By using two resistors of fixed resistance together with these two strain gauges in a Wheatstone bridge circuit as shown in FIG. 4, it is possible to obtain the magnitude of a load similarly from the output voltage. In summary, any such modifications and variations that may be apparent to a person skilled in the art are intended to be included within the scope of this invention.

What is claimed is:

1. A load cell comprising
a cantilever-type load-sensitive element having an upper beam and a lower beam, each of said beams having a pair of strain-generating parts which generate strains corresponding to a load applied to said load cell,
strain-detecting elements attached to either one but not both of said beams at positions corresponding to said strain-generating parts, said strain-detecting elements being attached to a bottom surface of an indented part formed on a surface of said one beam,
a moisture-proof material covering said strain-detecting elements, and
a moisture-proof sheet covering said moisture-proof material attached to small areas of said one beam and not attached to said moisture-proof material so as to seal the interior of said indented part and to only negligibly interfere with deformation of said load-sensitive element by said applied load.

2. The load cell of claim 1 wherein said moisture-proof material comprises rubber.

3. The load cell of claim 1 further comprising a sheet-like covering member which is disposed on said moisture-proof material and serves to prevent said moisture-proof material from sticking to said moisture-proof sheet.

4. The load cell of claim 3 wherein said sheet-like covering member comprises a moisture-proof polymer film laminated or not laminated with a metallic foil.

5. The load cell of claim 1 wherein said moisture-proof sheet comprises a polymer film laminated with a metallic foil.

6. The load cell of claim 1 wherein said strain-detecting elements are displaced from said strain-generating parts by a small distance determined so as to obtain an optimum linearity relationship between the strain generated at said strain-generating parts and the magnitude of said applied load.

7. The load cell of claim 1 wherein said upper beam has a top surface, said indented part is formed on said top surface, and said upper beam has reduced thickness at said strain-generating parts.

8. The load cell of claim 7 wherein said load-sensitive element also includes vertically elongated fixed and movable portions, both said upper and lower beams being attached to said portions such that said load-sensitive element is of a hollow rectangular form.

9. The load cell of claim 8 wherein said lower beam also has reduced thickness at said strain-beam generating parts, said upper beam being thinner at its strain-generating parts than said lower beam at its strain-generating parts.

10. The load cell of claim 7 wherein said indented part is elongated longitudinally along said upper beam between two end edges, said bottom surface of said indented part is lower than and flanked by longitudinally extending edge parts of said top surface, and said moisture-proof sheet is non-adhesively in contact with said longitudinally elongated edge parts of said top surface.

11. The load cell of claim 10 wherein said top surface has rounded edges along said longitudinally elongated edge parts where said moisture-proof sheet is in contact with said top surface.

12. The load cell of claim 10 wherein said moisture-proof sheet is adhesively attached to said top surface only over narrow areas along said end edges.

13. The load cell of claim 12 wherein said moisture-proof sheet is adhesively attached also to side surfaces of said load-sensitive element adjacent to said longitudinally elongated edge parts.

* * * * *